No. 691,441. Patented Jan. 21, 1902.
H. S. CARR.
APPARATUS FOR DETERMINING THE FREQUENCY OF ALTERNATING CURRENTS.
(Application filed July 12, 1901.)
(No Model.)
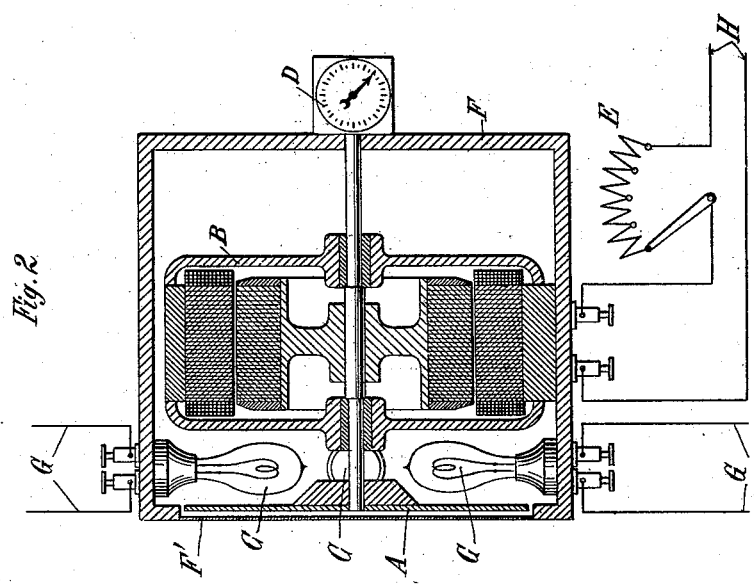
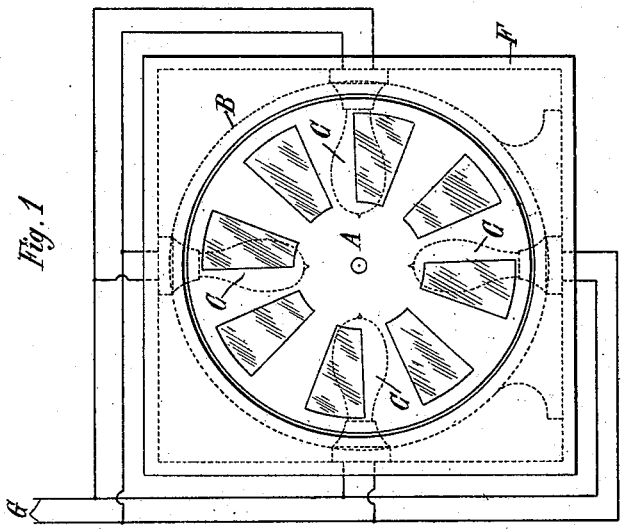
Witnesses:
Raphaël Netter
Benjamin Miller
Hugh S. Carr, Inventor,
by Kerr, Page & Cooper, Att'ys

UNITED STATES PATENT OFFICE.

HUGH S. CARR, OF LAWRENCE, KANSAS.

APPARATUS FOR DETERMINING THE FREQUENCY OF ALTERNATING CURRENTS.

SPECIFICATION forming part of Letters Patent No. 691,441, dated January 21, 1902.

Application filed July 12, 1901. Serial No. 67,983. (No model.)

*To all whom it may concern:*

Be it known that I, HUGH S. CARR, a citizen of the United States, residing at Lawrence, in the county of Douglas and State of Kansas, have invented certain new and useful Improvements in Apparatus for Determining the Frequency of Alternating Currents, of which the following is a specification, reference being had to the drawings accompanying and forming a part of the same.

The invention, subject of my present application, is a new and improved apparatus by means of which the frequency of an alternating current may be accurately and readily determined at any time and by means of which the difference of phase in alternating-current devices may be ascertained.

The underlying principle of my improved apparatus is that of the stroboscopic effect of a revolving disk divided into alternate sectors with reflecting and non-reflecting surfaces or composed of alternate translucent and opaque materials. I have found that if such a disk be revolved in the light produced by an arc or incandescent lamp which is connected with an alternating-current circuit the slight fluctuations in the intensity of the light due to the variations in the strength of the current will produce the illusion of a revolution of the sectors whenever the alternations of the current and the revolutions of the disk are not in synchronism. If the number of revolutions per second of the disk be in excess of the number of alternations per second of the current, the apparent revolution of the sectors is clockwise when the disk revolves clockwise, while if the number of alternations exceeds the number of revolutions per unit of time the apparent movement of the sectors is counter-clockwise when the disk revolves clockwise. When, however, the number of revolutions of the disk and alternations of the current are the same, the sectors will appear stationary, and the same will be true if the number of revolutions of the disk is any exact multiple of one-half the number of alternations.

In alternating-current work it is frequently of considerable practical and commercial importance to be able to determine at any instant the rate of alternation of some given alternating-current generator. In determining also the efficiencies and working conditions of transformers in nearly all alternating-current devices the frequency of alternation enters directly as an important factor, and its quick and accurate determination is essential both for the best conditions of operation and structural design. It is, moreover, of great importance in the running of alternating devices in conjunction with each other to determine the moments of synchronism.

The frequency of an alternating current is usually determined by calculations based upon the number of poles, the special construction of the generator, and the speed at which the latter is driven; but since this speed is subject to sudden and inevitable changes such calculations are only approximate and cannot be relied upon as affording accurate information as to conditions which may exist at any given instant. Moreover, this means of determining frequencies is not available at transformer-substations or at any point remote from the generator, in which cases there is no practical means of which I am aware by which even approximately accurate calculations of frequency can be made.

In carrying out my invention by utilizing the peculiar effect of an alternating-current lamp upon a revolving stroboscopic disk I have used a disk of metal with alternate black and white sectors painted upon it. This I have revolved by means of a small motor supplied from the same circuit as the lamp, using a rheostat to regulate the speed of the motor. A suitable tachometer is used for indicating at any instant the speed of the motor, and when it is brought to the point where the rays of light of the lamp reflected from the disk cause the sectors to appear stationary the motor, or the disk, if the latter be directly connected to the shaft of the motor, will be found to be running in synchronism with the alternating-current generator. If the disk is running below synchronism and right-handed, the sectors will appear to revolve counter-clockwise, while if running above synchronism they will revolve clockwise. If the disk be divided into the same number of alternate segments as the number of poles in the alternating-current generator, then the speed of the motor and disk will be the same as that of the generator when the rays of light from the lamp used make the sectors appear stationary. These latter will also appear stationary, as has been stated above, when the disk is running at half speed or one and a half times the speed or twice the speed of the generator; but the most stable condition is when the disk is running at the same speed as the generator.

In practice I have found that transmitted rays are preferable to reflected light, because with the latter an arc-lamp is almost necessary, and this is not so convenient and available as an incandescent lamp. I therefore employ one or more alternating incandescent lamps inclosed in a suitable case, one side of which is composed of some translucent material, such as tracing-cloth. In front of these lamps a disk composed of alternate solid and opaque and cutaway or translucent sectors is mounted, and when the latter is revolved a clear and pronounced stroboscopic effect is produced, which may be easily seen even in daylight, so that the device can be used at any time as well as at any point on an alternating system. The revolutions of the disk may be effected in any convenient manner, as by motors connected with the alternating circuit itself or from any other source, and the disk may be either within or without the case.

This apparatus can also be used as a phase indicator for two or more alternating currents in the following manner: The rays of light from the arc or incandescent lamp on one generator-circuit are made to appear stationary by a proper adjustment of the speed of the disk. Then the rays of light from a lamp on the second circuit are thrown on the disk and made to coincide with the rays from the first lamp by adjusting the speed of the second generator or motor. At the instant when the rays coincide the two machines are in synchronism and capable of being operated in conjunction.

My improved apparatus in the preferred form in which I have constructed the same is illustrated in the accompanying drawings, in which—

Figure 1 is a front elevation of the device, and Fig. 2 is a sectional plan of the same.

The working parts of the instrument are contained within a case F, having a circular opening in front, which is preferably covered by a ground-glass plate F' or a sheet of translucent material, such as tracing-cloth. Within the case there is mounted a motor B, which may be either an alternating motor, adapted to be run by current from the alternating-current circuit, or a continuous-current motor to be run from an independent source.

Any suitable means is employed for regulating and varying the speed of this motor, and in illustration of such a device I have shown a variable rheostat E in the circuit thereof.

Connected with the motor and preferably mounted directly upon its shaft is a disk A, composed of alternate sectors of translucent and opaque materials, and immediately back of said disk, or between the same and the motor, are placed one or more lamps C, in this case shown as incandescent lamps, the terminals of which are made accessible to enable them to be connected by wires G with the alternating-current circuit.

The shaft of the motor B is connected with any proper form of speed-indicator—as, for example, a small direct-current generator with constant field excitation and a voltmeter connected with the armature-circuit thereof or any other device, such as an ordinary tachometer. Such a device is indicated by the letter D.

It will now be understood from the above description that this apparatus may be used at any point in an alternating-current system for determining at any instant the frequency of the current, and in this resides the chief merit and practical value of the device.

Having now described my invention, what I claim is—

1. An apparatus for determining at any instant the frequency of an alternating current, comprising in combination, a stroboscopic disk, a motor for rotating the same, and means for regulating the speed of the motor, a speed-indicator therefor and one or more lamps adapted to be connected with the alternating-current circuit and so located with respect to the disk that the fluctuating illumination will produce a stroboscopic effect, as set forth.

2. An apparatus for determining at any instant the frequency of an alternating current, comprising in combination, an electromagnetic motor, a stroboscopic disk mounted directly on the shaft of said motor, one or more electric lamps adapted to be operated by connection with the alternating circuit, and means for varying and for indicating the speed of the motor, as set forth.

3. An apparatus for determining at any instant the frequency of an alternating current, comprising in combination, a box or case, an electromagnetic motor therein, a disk composed of alternate sectors of transparent and opaque materials and mounted directly upon the motor-shaft, one or more electric lamps adapted to be operated by connection with the alternating-current circuit and placed back of the disk within the case, and means for varying and for indicating the speed of the motor, as set forth.

4. An apparatus for determining at any instant the frequency of an alternating current, comprising in combination an electromagnetic motor adapted to be operated by connection with the alternating-current circuit, a disk composed of alternate sectors of translucent and opaque materials mounted directly on the shaft of said motor, one or more electric lamps adapted to receive current from the alternating-current circuit and placed back of said disk, a speed-indicator connected with the motor-shaft and means for varying the speed of the motor, as set forth.

HUGH S. CARR.

Witnesses:
 J. F. MALICK,
 JOHN HUGHES.